United States Patent Office 3,452,063
Patented June 24, 1969

1

3,452,063
17α-METHYL-3α-THIOCYANO-5α-ANDROSTAN-17β-OL
Paul D. Klimstra, Northbrook, Ill., assignor to G. D. Searle & Co., Chicago, Ill., a corporation of Delaware
No Drawing. Filed Mar. 1, 1967, Ser. No. 619,592
Int. Cl. C07c 169/20
U.S. Cl. 260—397.5          2 Claims

ABSTRACT OF THE DISCLOSURE

Novel steroidal derivatives characterized by a 3α-thiocyano substituent and useful in view of their pharmacological properties, e.g. anti-inflammatory, androgenic, estrogenic, anti-estrogenic, hypocholesterolemic, pepsin-inhibitory, anti-bacterial and anti-protozoal. These compounds are manufactured by reaction of a metallic thiocyanate with a suitable ester, e.g. the p-toluenesulfonate, of the appropriately 17-substituted 3β-hydroxy starting material.

---

The present invention is concerned with novel chemical compounds of the steroid class and, in particular, of the androstane family. These steroidal derivatives are more fully defined as 3α-thiocyano-5α-androstan-17-one and derivatives thereof and are illustrated by the following structural formula

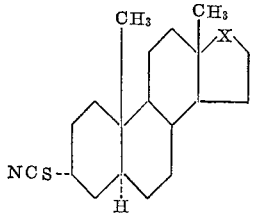

wherein X represents a carbonyl or

radical, Y being hydrogen or a lower alkanoyl radical and Z denoting a lower aliphatic hydrocarbon radical.

The lower aliphatic hydrocarbon radicals denoted by Z encompass lower alkyl radicals as exemplified by methyl, ethyl, isopropyl, secondary-butyl, tertiary-butyl and heptyl, lower alkenyl radicals as typified by vinyl, allyl, methallyl, propenyl and heptenyl and lower alkynyl radicals as illustrated by ethynyl, propynyl, propargyl, heptynyl and the corresponding branched-chain isomeric groups.

The novel compounds of this invention are most conveniently produced by processes which utilize, as the starting materials, compounds of the following structural formula

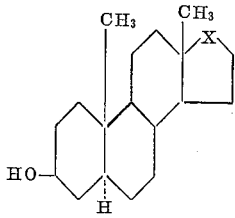

2 wherein X is as hereinbefore defined. The initial step of those processes involves conversion of the 3β-hydroxy moiety to a suitable esterified function. The p-toluenesulfonyloxy ester is a derivative especially preferred for this process. Those esters are heated, preferably in a suitable inert organic solvent medium such as dimethyl sulfoxide, with a metallic thiocyanate, typically an alkali metal thiocyanate such as sodium thiocyanate, potassium thiocyanate or lithium thiocyanate, to afford the instant 3α-thiocyano compounds. Those processes are specifically illustrated by the reaction of 17α-methyl-5α-androstane-3β,17β-diol with p-toluenesulfonyl chloride in pyridine followed by heating of a dimethyl sulfoxide solution of the resulting p-toluenesulfonate with potassium thiocyanate to afford 17α-methyl-3α-thiocyano-5α-androstan-17β-ol.

An alternate method for production of the instant 17β-hydroxy compound involves reduction of the corresponding 17-keto substance with a suitable metallic reagent, for example lithium aluminum hydride, sodium borohydride, lithium tri-(tertiary-butoxy) aluminum hydride or diisobutyl aluminum hydride. 3α-thiocyano-5α-androstan-17-one is thus allowed to react in tetrahydrofuran with lithium tri-(tertiary butoxy) aluminum hydride to afford 3α-thiocyano-5α-androstan-17β-ol.

Acylation of 3α-thiocyano-5α-androstan-17β-ol with a lower alkanoic acid anhydride or halide, preferably in the presence of a suitable acid acceptor such as pyridine or triethylamine, results in the instant 17-(lower alkanoates). Reaction at room temperature with acetic anhydride and pyridine, for example, affords 3α-thiocyano-5α-androstan-17β-ol acetate.

The compounds of the present invention are useful as a result of their valuable pharmacological properties. They are anti-inflammatory agents, for example, as is evidenced by their ability to inhibit the edematous tissue swelling associated with inflammatory states. They exhibit also androgenic, estrogenic, anti-estrogenic, hypocholesterolemic and pepsin-inhibitory activity. They are, furthermore, anti-bacterial and anti-protozoal agents as indicated by their ability to inhibit the growth of such organisms as *Diplococcus pneumoniae* and *Tetrahymena gelleii*.

The invention is detailed more fully by the examples which appear hereinafter. Many modifications of those examples, both in materials and methods, will be apparent, however, to persons skilled in the art of organic chemistry. The details thus are not to be construed as limiting the invention either in spirit or in scope. The temperatures indicated are in degrees centigrate (° C.), and the quantities designated are in parts by weight except in the instances where it is specifically otherwise noted.

EXAMPLE 1

A mixture of 20 parts of 3β-p-toluenesulfonyloxy-5α-androstan-17-one, 40 parts of potassium thiocyanate and 500 parts by volume of dimethyl sulfoxide is heated at 75–85° with stirring for about 4 hours, then is cooled and poured carefully into water. The resulting yellow solid precipitate is collected by filtration, washed on the filter with water, then extracted with ether. The ether extract is filtered in order to remove dark suspended material, then is washed several times with water and dried over anhydrous sodium sulfate containing decolorizing carbon. Removal of the solvent by distillation under reduced pressure affords an oily residue, which is purified by chromatography on silica gel followed by elution with 5% ethyl acetate in benzene to yield the crude product. Purification by recrystallization from aqueous methanol affords 3α-thiocyano-5α-androstan-17-one, melting at about 137–138° and characterized by an optical rotation, in chloroform, of +96.5°. This compound is represented by the following structural formula

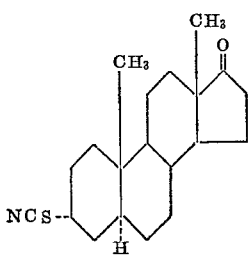

EXAMPLE 2

To a solution of 1.3 parts of 3α-thiocyano-5α-androstan-17-one in 45 parts of tetrahydrofuran, cooled to 0–5° by means of an ice bath, is added 4 parts of lithium tri-(tertiary-butoxy) aluminum hydride, and the resulting reaction mixture is stirred for about 1 hour, then is poured into a mixture of ice and 10% aqueous acetic acid. The solid precipitate which forms is collected by filtration, washed with water, dried in air, then recrystallized from methanol to yield 3α-thiocyano-5α androstan-17β-ol, which displays a double melting point at about 154–158° and 170–172°. This compound exhibits an optical rotation, in chloroform, of +22° and is structurally illustrated by the following formula

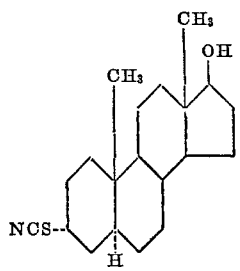

EXAMPLE 3

A mixture containing 5 parts of 3α-thiocyano-5α-androstan-17β-ol, 50 parts of acetic anhydride and 100 parts of pyridine is stored at room temperature for about 16 hours, then is poured carefully into a large volume of water. The resulting aqueous mixture is extracted with benzene, and that organic solution is dried over anhydrous potassium carbonate, then is stripped of solvent under reduced pressure to yield 3α-thiocyano-5α-androstan-17β-ol acetate.

EXAMPLE 4

When an equivalent quantity of propionic anhydride is substituted in the procedure of Example 3, there is produced 3α-thiocyano-5α-androstan-17β-ol propionate.

EXAMPLE 5

A solution of 10 parts of 17α-methyl-5α androstane-3β,17β-diol in 50 parts of pyridine is cooled to about 10°, and 10 parts of p-toluenesulfonyl chloride is added slowly. The resulting mixture is stirred until homogeneous, a period of about 45 minutes being required, then is allowed to stand at room temperature for about 16 hours. At the end of that reaction period the mixture is poured into water, and the precipitate which forms is collected by filtration, washed with water and dried in air to yield 17α-methyl-5α-androstane-3β,17β-diol 3-p-toluenesulfonate.

A mixture containing 10 parts of 17α-methyl-5α-androstane-3β,17β-diol 3-p-toluenesulfonate, 20 parts of potassium thiocyanate and 250 parts by volume of dimethyl sulfoxide is heated with stirring at about 70° for approximately 4½ hours, then is poured carefully into cold water. The resulting precipitate is extracted with ethyl acetate, and the organic extract is washed with water, then dried over anhydrous sodium sulfate containing decolorizing carbon. Removal of the solvent by distillation under reduced pressure affords a solid residue, which is dissolved in a 3:10 mixture of ethyl acetate in benzene. That organic solution is stirred with silica gel, and the solvent is evaporated to leave the crude product on the adsorbent. Elution of the silica gel with 15% ethyl acetate in benzene followed by recrystallization of the resulting eluted fraction from acetone-hexane yields 17α-methyl-3α-thiocyano-5α-androstan - 17β - ol, melting at about 160° and represented by the following structural formula

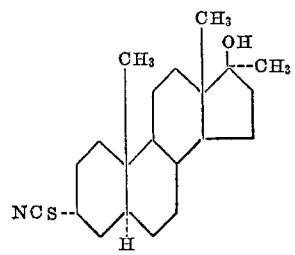

EXAMPLE 6

When an equivalent quantity of 17α-ethyl-5α-androstane-3β,17β-diol is subjected to the successive processes of Example 5, 17α-ethyl-5α-androstane-3β,17β-diol 3-p-toluenesulfonate and 17α - ethyl-3α-thiocyano-5α-androstan-17β-ol are produced.

EXAMPLE 7

The substitution of an equivalent quantity of 17α-ethynyl-5-α-androstane-3β,17β-diol in the procedure described in Example 5 results in 17α-ethynyl-5α-androstane-3β,17β-diol 3-p-toluenesulfonate and 17α-ethynyl-3α-thiocyano-5α-androstan-17β-ol.

EXAMPLE 8

By substituting an equivalent quantity of 17α-propynyl-5α-androstane-3β,17β-diol and otherwise proceeding according to the processes described in Example 5, there are obtained 17α-propynyl-5α-androstane-3β,17β-diol 3-p-toluenesulfonate and 17α - propynyl - 3α - thiocyano-5α-androstan-17β-ol.

EXAMPLE 9

When 17α-vinyl-5α-androstane-3β,17β-diol is acylated by the procedure described in Example 5 and the resulting p-toluenesulfonate is contacted with potassium thiocyanate according to the process described in that example, there is obtained 3α-thiocyano-17α-vinyl-5α-androstan-17β-ol.

EXAMPLE 10

The substitution of an equivalent quantity of 17α-propenyl-5α-androstane-3β,17β-diol in the procedure of Example 5 results in 17α-propenyl-5α-androstane-3β,17β-diol-3-p-toluenesulfonate, which is converted to 3α-thiocyano-17α-propenyl-5α-androstan-17β-ol according to the process described in that example.

What is claimed is:
1. A compound of the formula
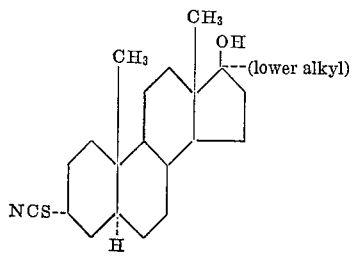
2. As in claim 1, the compound which is 17α-methyl-3α-thiocyano-5α-androstan-17β-ol.
References Cited
UNITED STATES PATENTS
3,265,713  8/1966  Kawanami _____ 260—397.5
OTHER REFERENCES
Tori et al.: Tetrahedron 21 2, February 1965, pp. 309–328 (p. 312 relied upon).
ELBERT L. ROBERTS, *Primary Examiner.*